United States Patent [19]

Trinkaus

[11] Patent Number: 4,953,266
[45] Date of Patent: Sep. 4, 1990

[54] ONE-PIECE PLASTIC CLIP

[75] Inventor: Karl Trinkaus, Darmstadt, Fed. Rep. of Germany

[73] Assignee: Wella Aktiengesellschaft, Darmstadt, Fed. Rep. of Germany

[21] Appl. No.: 394,827

[22] Filed: Aug. 16, 1989

[30] Foreign Application Priority Data

Aug. 26, 1988 [DE] Fed. Rep. of Germany ....... 8810826

[51] Int. Cl.⁵ ......................... A41F 1/00; A44B 21/00
[52] U.S. Cl. ........................................ 24/499; 24/303; 24/500
[58] Field of Search ............... 128/499, 500, 501, 502, 128/503, 489, 303, 49 M, 782

[56] References Cited

U.S. PATENT DOCUMENTS

| | | | |
|---|---|---|---|
| 488,522 | 12/1892 | Jones | 24/502 |
| 2,461,333 | 2/1949 | Maccaferri | 24/501 |
| 3,629,905 | 12/1971 | Cote | 24/303 |
| 3,629,912 | 12/1971 | Klopp | 24/457 |
| 3,649,954 | 3/1972 | Kurtz | 24/502 |
| 4,413,635 | 11/1983 | Myer | 24/500 |
| 4,839,947 | 6/1989 | Cohen et al. | 24/499 |

FOREIGN PATENT DOCUMENTS

| | | | |
|---|---|---|---|
| 0124498 | 11/1984 | European Pat. Off. | 24/499 |
| 1570080 | 6/1969 | France | 24/499 |
| 2360706 | 3/1978 | France | 24/499 |

*Primary Examiner*—Victor N. Sakran
*Attorney, Agent, or Firm*—Michael J. Striker

[57] ABSTRACT

The one-piece plastic clip comprises two clamping members and two spreadable handles, each of which is connected to one of the clamping members, a pivot bearing and a U-shaped compression spring connected between the ends of the handles. The pivot bearing is structured to be assembled by snapping-together. Advantageously the plastic clip is made with polyoxymethylene. Sensors including temperatures sensors may be located in the clamping members. A Contact-Reed can be located in one clamping member and a permanent magnet can be located in another clamping member so that unintended loosening of the clip can be detected. The clip may be structured for use as a cloths pin or a hair clip for use in a permanent wave treatment.

8 Claims, 2 Drawing Sheets

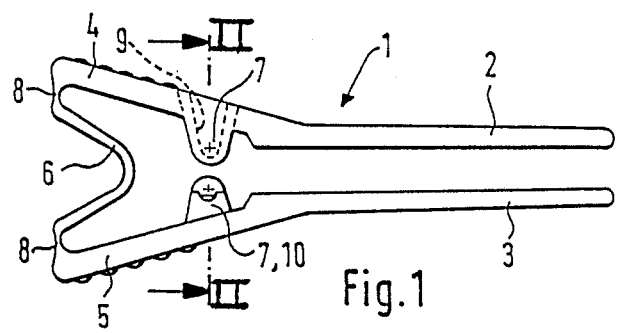
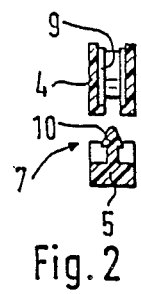
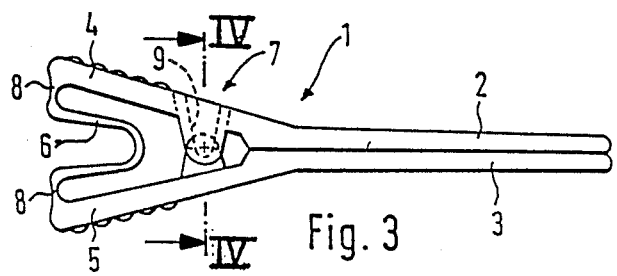
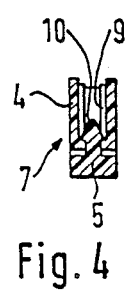
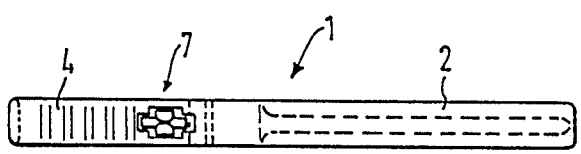
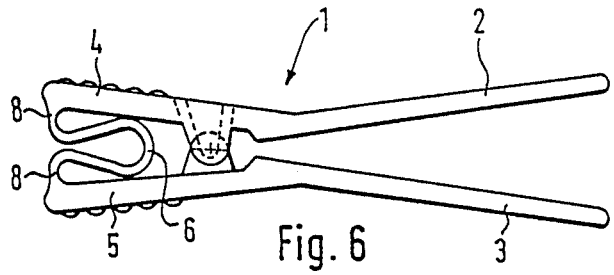

ONE-PIECE PLASTIC CLIP

BACKGROUND OF THE INVENTION

My invention relates to a one-piece plastic clip.

A clip of this type is described in German Patent No. 77 29 057. This paper discloses a clip with a compression spring, which is formed substantially V-shaped and is connected by a film hinge inside in the vicinity of the spreadable handles. An unsatisfactory spring action results from this structure. A film hinge connection is proposed as a pivot bearing, which has the disadvantage that it is very easily broken. Moreover such a clip is expensive and troublesome to manufacture.

SUMMARY OF THE INVENTION

Accordingly, it is an object of my invention to provide a clip which does not have the above-described disadvantages.

It is another object of my invention to provide a plastic clip with improved spring properties for a variety of applications.

In keeping with these objects and with others which will become apparent hereinafter, the one-piece plastic clip comprises two clamping members at one end of the clip and two spreadable handles at the other end of the clip, a pivot bearing and a compression spring. The spreadable handles are connected with the compression spring, advantageously the ends of the handles not connected to the clamping members are directly connected by the spring. The pivot bearing is structured for assembly by snapping-together.

The plastic used for the clip is advantageously polyoxymethylene.

Advantageously, the spring is formed substantially U-shaped and connected across the spreadable handles.

In the plastic clip according to my invention both ends of the spreadable handles are connected by a compression spring and a snappable-together pivot bearing is provided, whereby only a comparatively simple manufacturing tool is needed for making the clip according to my invention. The U-shape form of the spring allows good spring properties so that advantageously the spring is mounted inside the spreadable handles. The spring properties are be determined by its material properties and dimensions of the spring (i.e. strength, width, length and the constrictions).

In an additional embodiment of my invention a clamping member is provided with a heat (i.e. temperature) sensor, whereby the heat sensor, e.g. as a temperature measuring clip for a hair curler, can be clamped on an object to be measured in the form of a hair strand wound on a curler in a temperature controlled permanent wave treatment.

In another embodiment of my invention a Reed-Contact is located in one clamping member and a permanent magnet is located in another clamping member so that with the clip clamping members touching the Reed-Contact is acted on magnetically by the permanent magnet. Because of that a clip loosened unintentionally from the object can be detected, e.g. in the above-mentioned permanent wave treatment. One such device for performing a thermally-controlled permanent wave treatment is described in European Patent No. 0 072 994-B2.

According to the form of the clamping member the clip can be used for special purposes, e.g. as a hair clip or cloths pin. For the above-mentioned clip with heat or temperature sensor a claw-shaped element is advantageously provided on the end of one clamping member so that there is a satisfactory engagement with a curler.

BRIEF DESCRIPTION OF THE DRAWING

The objects, features and advantages of my invention will be made more apparent from the following detailed description, reference being made to the accompanying drawing in which:

FIG. 1 is a side elevational view of a first embodiment of a clip according to my invention in one configuration, FIG. 2 is a cross sectional view of the clip as shown in FIG. 1 taken along the section line II—II of FIG. 1, FIG. 3 is a side elevational view of the clip shown in FIG. 1 in another assembled configuration, FIG. 4 is a cross sectional view of the clip in the configuration as shown in FIG. 3 taken along the section line IV—IV of FIG. 3, FIG. 5 is a top plan view of the clip shown in FIG. 1, FIG. 6 is a side elevational view of the clip of FIG. 1 in a third configuration with clamping members spread manually.

DETAILED DESCRIPTION OF THE INVENTION

Figure 7:
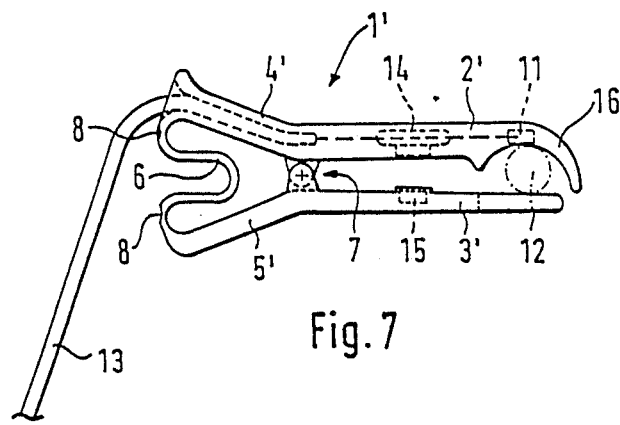
FIG. 7 is a side elevational view of a second embodiment of a clip according to my invention.

A one-piece plastic clip 1 according to my invention is shown in FIG. 1. It comprises two clamping members 2,3 connected to two spreadable handles 4,5. The ends of the spreadable handles 4,5 are connected by a compression spring 6, which is substantially U-shaped and is positioned inside the spreadable handles 4,5. A pivot bearing 7 assembled by snapping-together is located in the region between the clamping members 2,3 and the spreadable handles 4,5. In FIG. 1 the pivot bearing 7 is still not snapped together, but is in an unassembled configuration as it appears as the plastic clip 1 drops from the tool. A more economical and/or simpler tool could be actualized, because the plastic clip 1 is provided with clamping members 2,3 which are oriented approximately 90° to each other, if necessary also about 180°. However in the scope of the ability of one skilled in the art the connection of the compression spring 6 with the spreadable handles 4,5 must be modified. The spring 6 has a thinned or constricted section near the location of its connection with the spreadable handles 4,5, so that improved spring characteristics are attained.

In FIG. 2 the pivot bearing 7 is shown in a cross section taken along the section line II—II of FIG. 1. The upper half of the pivot bearing 7 is provided with an undercutting 9, whereby a locking projection 10 can lock rotatably with this undercutting 9 and then forms the pivot bearing 7.

A ready-for-use clip 1 with snapped together pivot bearing 7 is shown in FIG. 3. In this position the spring 6 is under compression and presses both clamping members 2,3 together both clamping members 2,3 beyond the pivot bearing 7. An automatic snapping together of the pivot bearing 7 is effected very easily because both bearing halves are guided centrally by the spring connection.

FIG. 4 shows the configuration with the snapped in pivot bearing 7. Thus the pivot bearing connection is so dimensioned that only a small play between the locking projection 10 and the undercutting 9 is present.

FIG. 5 shows a top view on the plastic clip of the embodiment of FIG. 1. As required the clamping members 2,3 can be formed in a variety of ways, e.g. as hair clips, as indicated in dotted.

The clip 1 spread manually is shown in FIG. 6 and the spring 6 in this spread configuration is clearly under compression.

FIG. 7 shows a second embodiment of a clip 1' with a temperature sensor 11, which is located in one clamping member 2' and for example serves to measure a hair temperature of a strand wound on a curler 12. An electrical conductor transmits the electrical temperature value of the sensor 11. For observation a Reed-Contact 14 is located in one clamping member 2' and a permanent magnet 15 is located in the other clamping member 3'. Should the clip 1' be loosened unintentionally from the curler 12, the Reed-Contact 14 is activated because of its nearness to the permanent magnet 15 to the Reed-Contact 14, whereby an alarm signal can be conducted through the conductor 13. For a good seat of plastic clip 1' with the curler 12 a clamping member 2' is provided in a free end region with a claw-like element 16.

Figure 8:
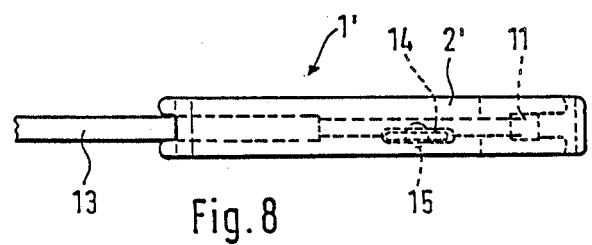
FIG. 8 is a top plan view of the clip shown in FIG. 7.

The clip 1' is shown in a top view in FIG. 8 for clarity.

Figure 9:
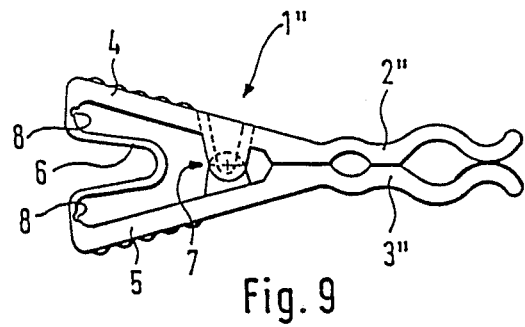
FIG. 9 is a side elevational view of a third embodiment of a clip according to my invention.

A third embodiment is shown in FIG. 9 is the shape of a wash clip or cloths pin 1" which is provided with specially shaped clamping members 2", 3".

For making the clips 1,1',1" polyoxymethylene has proven to be best, since it has good spring properties for the spring 6 as well as good sliding properties for the bearing 7.

It will be understood that each of the elements described above, or two or more together, may also find a useful application in other types of structures differing from the types described above.

While the invention has been illustrated and described as embodied in a one-piece plastic clip, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims. What is claimed is:

1. A one-piece plastic plastic clip having one end and another end comprising two clamping members at said one end and two speadable handles at said other end, a pivot bearing structured for assembly by snapping-together, a U-shaped compression spring located inside said spreadable handless and connecting said spreadable handles together, and a Reed-Contact located in one of said clamping members and a permanent magnet located in the other of said clamping members, said clamping members each having a free end portion.

2. A one-piece plastic clip according to claim 1, further comprising a claw-shaped element located at said free end portion of at least one of said clamping members.

3. The improvement according to claim 1, wherein said clip is formed like a hair clip.

4. The improvement according to claim 1, wherein said clip is formed like a clothes pin.

5. The improvement according to claim 1, wherein said clip is made of polyoxymethylene.

6. The improvement according to claim 1, wherein each of said spreadable handles has one end connected to one of said clamping members and another end not connected to one of said clamping members and said compression spring is connected to said other ends of said spreadable handles.

7. A one-piece plastic clip according to claim 5, further comprising a temperature sensor located in one of said clamping members.

8. A one-piece plastic clip according to claim 1, wherein each of said spreadable handles has one end connected to one of said clamping members and another end not connected to said one of said clamping members, said connection spring is connected between said other ends of said spreadable handles, said compression spring, said handles and said clamping members being made of polyoxymethylene.

* * * * *